(12) United States Patent
Huang et al.

(10) Patent No.: US 11,055,553 B1
(45) Date of Patent: Jul. 6, 2021

(54) IMAGE PROCESSING SYSTEM AND METHOD

(71) Applicant: NANYA TECHNOLOGY CORPORATION, New Taipei (TW)

(72) Inventors: Jih-Cheng Huang, Taoyuan (TW); Shin-Chen Hu, Taipei (TW); Te-Chou Chang, New Taipei (TW)

(73) Assignee: Nanya Technology Corporation, New Taipei (TW)

(*) Notice: Subject to any disclaimer, the term of this patent is extended or adjusted under 35 U.S.C. 154(b) by 0 days.

(21) Appl. No.: 16/853,245

(22) Filed: Apr. 20, 2020

(51) Int. Cl.
*G06K 9/20* (2006.01)

(52) U.S. Cl.
CPC ................. *G06K 9/2027* (2013.01)

(58) Field of Classification Search
CPC .................................... G06K 9/2027
See application file for complete search history.

(56) References Cited

U.S. PATENT DOCUMENTS

| | | | | |
|---|---|---|---|---|
| 8,553,968 B1* | 10/2013 | Lee | ........................ | G06K 9/03 382/141 |
| 2007/0288219 A1* | 12/2007 | Zafar | .................... | G06T 7/0008 703/14 |
| 2009/0139312 A1* | 6/2009 | Hawthorne | .......... | G01N 27/002 73/105 |
| 2013/0156293 A1* | 6/2013 | Shi | ..................... | G01N 21/8806 382/145 |
| 2018/0164696 A1* | 6/2018 | Moriya | ............... | G03F 7/70725 |

* cited by examiner

*Primary Examiner* — Edward Park

(74) *Attorney, Agent, or Firm* — Muncy, Geissler, Olds & Lowe, P.C.

(57) ABSTRACT

The present disclosure provides an image processing system and method. The system includes an image capturing unit and an image processing unit. The image capturing unit includes a camera, a light source, and a wafer transfer stage. The camera captures an image of a wafer mark. The light source is capable of projecting through a plurality of chemical residues on the wafer mark. The image processing unit includes an image processor and an object matching subsystem. The image processor is configured to perform calculations of the image processing unit to generate an output result. The object matching subsystem includes an object matching unit and a memory unit. The object matching unit includes an artificial intelligence (AI) statistical model for identifying each character of the wafer mark. The memory unit stores a set of probabilities of the object matching unit detecting each character of the wafer mark in each image.

17 Claims, 10 Drawing Sheets

IMAGE PROCESSING SYSTEM AND METHOD

TECHNICAL FIELD

The present disclosure relates to an image processing system and method for processing and reading a wafer mark.

DISCUSSION OF THE BACKGROUND

In the semiconductor industry, rapid growth has been experienced due to improvements with integration density. Semiconductor devices manufactured in wafers require careful control and identification by wafer marks. However, chemical residues often obscure the wafer marks during fabrication of the semiconductor devices. Accordingly, systems and methods for processing and reading the wafer marks need to be capable of recognizing obscured characters and provide accurate identification of the wafer marks.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides an image processing system, including an image capturing unit and an image processing unit. The image capturing unit includes a camera, a light source, and a wafer transfer stage. The camera captures an image of a region of a wafer having a wafer mark. The light source surrounds the camera and is capable of projecting through a plurality of chemical residues on the wafer mark. The wafer transfer stage is configured to carry the wafer. The image processing unit includes an image processor and an object matching subsystem. The image processor is configured to perform calculations of the image processing unit to generate an output result. The object matching subsystem includes an object matching unit and a memory unit. The object matching unit includes an artificial intelligence (AI) statistical model for performing a statistical analysis to identify each character of the wafer mark. The memory unit stores a set of probabilities of the object matching unit identifying each character of the wafer mark in each image of the wafer mark.

In some embodiments, the image processing unit further comprises an advanced image processing subsystem comprising an advanced image processing engine and an object recognition unit, wherein the advanced image processing engine and the object recognition unit utilize an edge detection and image stacking technique to further process the image of the wafer mark.

In some embodiments, the statistical analysis performed by the object matching unit comprises comparing the set of probabilities for detecting each character of the wafer mark to a threshold value.

In some embodiments, the statistical analysis performed by the object matching unit further comprises identifying each character of the wafer mark by finding each character having a highest probability in the comparison between the set of probabilities stored in the memory unit and the threshold value, among all of the images of the wafer mark.

In some embodiments, the camera is an area scan camera capable of capturing the image of the wafer mark in a backside or a frontside of the wafer.

In some embodiments, the light source is configured to provide a light of variable wavelength, intensity, and angle.

In some embodiments, the wafer mark conforms to a Semiconductor Equipment and Materials International (SEMI) character standard.

Another aspect of the present disclosure provides an image processing system, including an image capturing unit, one or more processors, and one or more computer-readable non-transitory storage media. The image capturing unit includes a camera, a light source, and a wafer transfer stage. The camera captures an image of a region of a wafer having a wafer mark. The light source surrounds the camera and is capable of projecting through a plurality of chemical residues on the wafer mark. The wafer transfer stage is configured to carry the wafer. The one or more computer-readable non-transitory storage media is coupled to the one or more processors and includes instructions operable when executed by the one or more processors to cause the image processing system to: receive the image captured by the camera; perform a statistical analysis using an artificial intelligence (AI) statistical model to identify each character of the wafer mark; store a set of probabilities for detecting each character of the wafer mark in each image of the wafer mark; and perform calculations to generate an output result.

In some embodiments, the one or more computer-readable non-transitory storage media further comprises instructions operable when executed by the one or more processors to cause the image processing system to utilize an edge detection and image stacking technique to further process the image of the wafer mark.

In some embodiments, the statistical analysis comprises comparing the set of probabilities for detecting each character of the wafer mark to a threshold value.

In some embodiments, the statistical analysis further comprises identifying each character of the wafer mark by finding each character having a highest probability in the comparison between the stored set of probabilities and the threshold value, among all of the images of the wafer mark.

In some embodiments, the camera is an area scan camera capable of capturing the image of the wafer mark in a backside or a frontside of the wafer.

In some embodiments, the light source is configured to provide a light of variable wavelength, intensity, and angle.

In some embodiments, the wafer mark conforms to a Semiconductor Equipment and Materials International (SEMI) character standard.

Another aspect of the present disclosure provides an image processing method including: capturing, by an camera of an image capturing unit, an image of a region of a wafer having a wafer mark; receiving, by an image processing unit, the image captured by the camera; performing, by an object matching subsystem, a statistical analysis using an artificial intelligence (AI) statistical model to identify each character of the wafer mark; storing, by a memory unit of the image processing unit, a set of probabilities for detecting each character of the wafer mark in each image of the wafer mark; and performing, by an image processor, calculations to generate an output result.

In some embodiments, the method further comprises utilizing, by an advanced image processing subsystem, an edge detection and image stacking technique to further process the image of the wafer mark.

In some embodiments, the step of performing the statistical analysis comprises comparing, by an object matching unit, the set of probabilities for detecting each character of the wafer mark to a threshold value.

In some embodiments, the step of performing the statistical analysis further comprises identifying, by the object matching unit, each character of the wafer mark by finding each character having a highest probability in the comparison between the set of probabilities stored in the memory unit and the threshold value, among all of the images of the wafer mark.

In some embodiments, the camera is an area scan camera capable of capturing the image of the wafer mark in a backside or a frontside of the wafer, and a light source of the image capturing unit is configured to provide a light of variable wavelength, intensity, and angle.

In some embodiments, the wafer mark conforms to a Semiconductor Equipment and Materials International (SEMI) character standard.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

Figure 1:
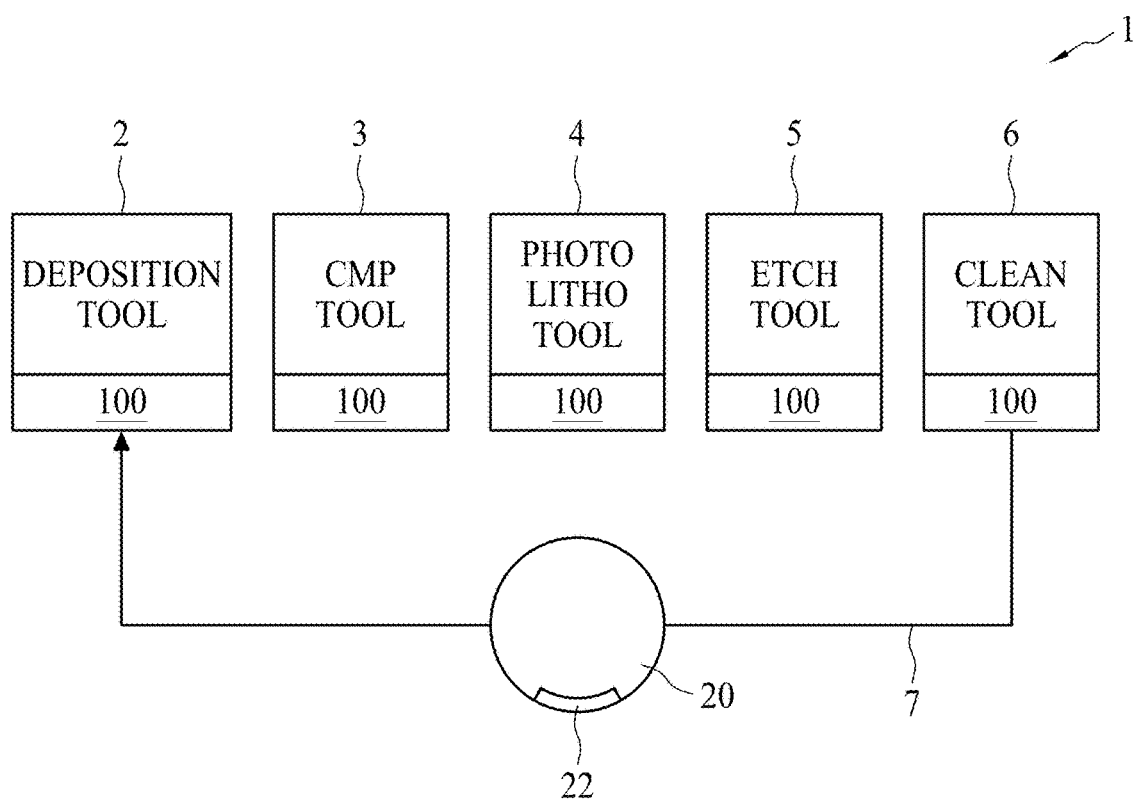
FIG. 1 is a block diagram of a semiconductor fabrication facility according to some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

To describe film-forming or deposition processes, the term "deposition" will generally be used herein for consistency. For film removal, the term "etch" will be used, and for a cleaning removal process, the term "clean" will be used. The figures may use other designations as applicable for illustrative clarity or convenience.

FIG. 1 is a block diagram of a semiconductor fabrication facility 1 according to some embodiments of the present disclosure. With reference to FIG. 1, the semiconductor fabrication facility 1 may include a plurality of semiconductor manufacturing apparatuses such as a deposition tool 2, a chemical mechanical polishing (CMP) tool 3, a photolithography tool 4, an etch tool 5, and a clean tool 6. In some embodiments, a design of microelectronic devices to be formed in a wafer 20 is produced, and a layout is made from the design. The layout may include sets of patterns that will be transferred to one or more stacked layers of materials that are applied to the wafer 20 during its fabrication in a process sequence 7 to form the various circuits and devices on the substrate of the wafer 20. To facilitate identification and management of the semiconductor devices formed in the wafer 20, a wafer mark 22 may be laser printed in the wafer 20, such as by using solid state diode lasers or pulsed gas lasers. In some embodiments, each of the tools 2 to 6 in the semiconductor fabrication facility 1 may include an image processing system 100 for processing and reading the characters of the wafer mark 22, as shown in FIG. 1. According to some embodiments, the process sequence 7 of the wafer 20 in the semiconductor fabrication facility 1 shown in FIG. 1 is an exemplary process flow which may be used several times to deposit or form films on a substrate of the wafer 20 and pattern them using a variety of lithography and etch techniques, and the wafer mark 22 facilitates the identification of the wafer 20 during the process sequence 7. Such general fabrication steps may include a deposition process using the deposition tool 2, a planarization and/or polishing process using the CMP tool 3, an exposure process with a patterned wavelength of light using the photolithography tool 4, a removal process of the exposed portions of the film using the etch tool 5, and a cleaning process using the clean tool 6 in preparation for subsequent processing. It should be noted that, more steps than deposition, planarization, photolithography, etch, and cleaning may be utilized in the semiconductor fabrication facility 1 as would be understood by a person of ordinary skill in the art. Moreover, each of the steps of a deposition, planarization, photolithography, etch, and clean process may include various specific steps. Therefore, the process sequence 7 depicted in FIG. 1 should not be construed as limiting with respect to embodiments of the present disclosure. It should be further understood that testing and shipment steps not shown in FIG. 1 may also require the image processing system 100 to process and recognize the wafer mark 22 for identification and management of the semiconductor devices in the wafer 20. In some embodiments, examples of the deposition techniques used in the deposition tool 2 may include chemical vapor deposition (CVD), electrochemical deposition (ECD), physical vapor deposition (PVD), molecular beam epitaxy (MBE), atomic layer deposition (ALD), self-assembled monolayer (SAM) deposition and others. In some embodiments, the deposition techniques may be complemented by the creation of plasma so as to suitably affect the chemical reactivity of the processes occurring at the substrate surface.

Figure 2:
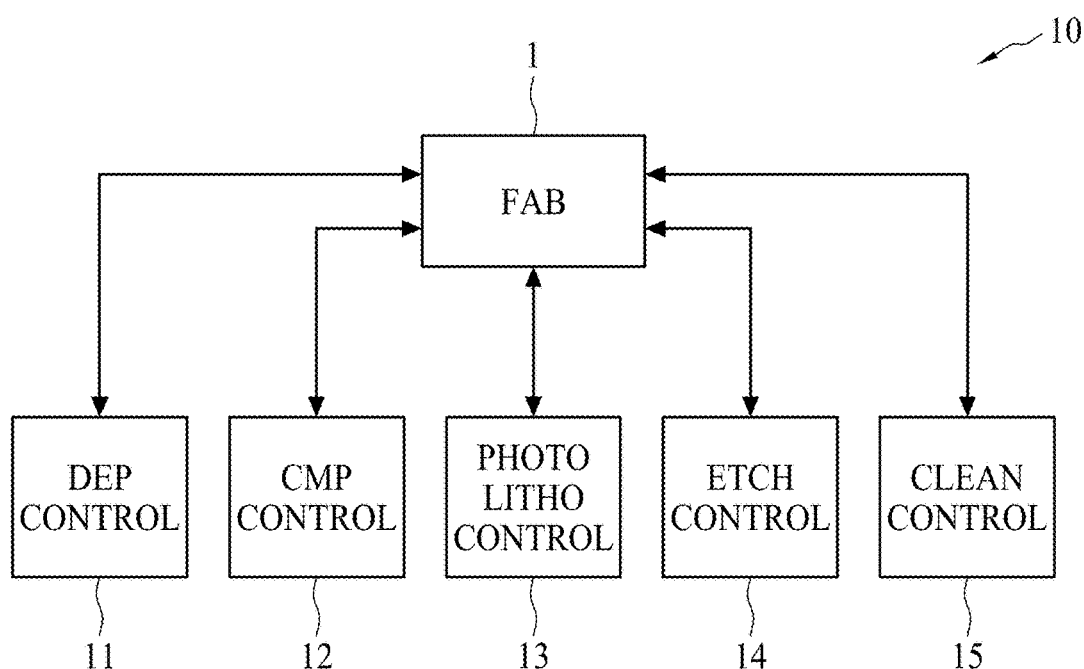
FIG. 2 is a block diagram of a control platform of the semiconductor fabrication facility in FIG. 1 according to some embodiments of the present disclosure.

FIG. 2 is a block diagram of a control platform 10 of the semiconductor fabrication facility 1 according to some embodiments of the present disclosure. With reference to FIG. 1 and FIG. 2, the control platform 20 includes a plurality of systems for controlling and monitoring the fabrication tools of the semiconductor fabrication facility 1. The control platform 10 may include a system 11 for controlling the deposition tool 2, a system 12 for controlling the CMP tool 3, a system 13 for controlling the photolithography tool 4, a system 14 for controlling the etch tool 5, and a system 14 for controlling the clean tool 6. In some embodiments, measurement or metrology data may be captured to control and optimize the fabrication processes performed by the fabrication tools of the semiconductor fabrication facility 1. In some embodiments, the image processing system 100 for processing and reading the wafer mark 22 may be embedded in each of the systems 11 to 15 for controlling the tools 2 to 6 of the semiconductor fabrication facility 1. In other embodiments, the image processing system 100 may reside in discrete modules separate from the systems 11 to 15.

Figure 3:
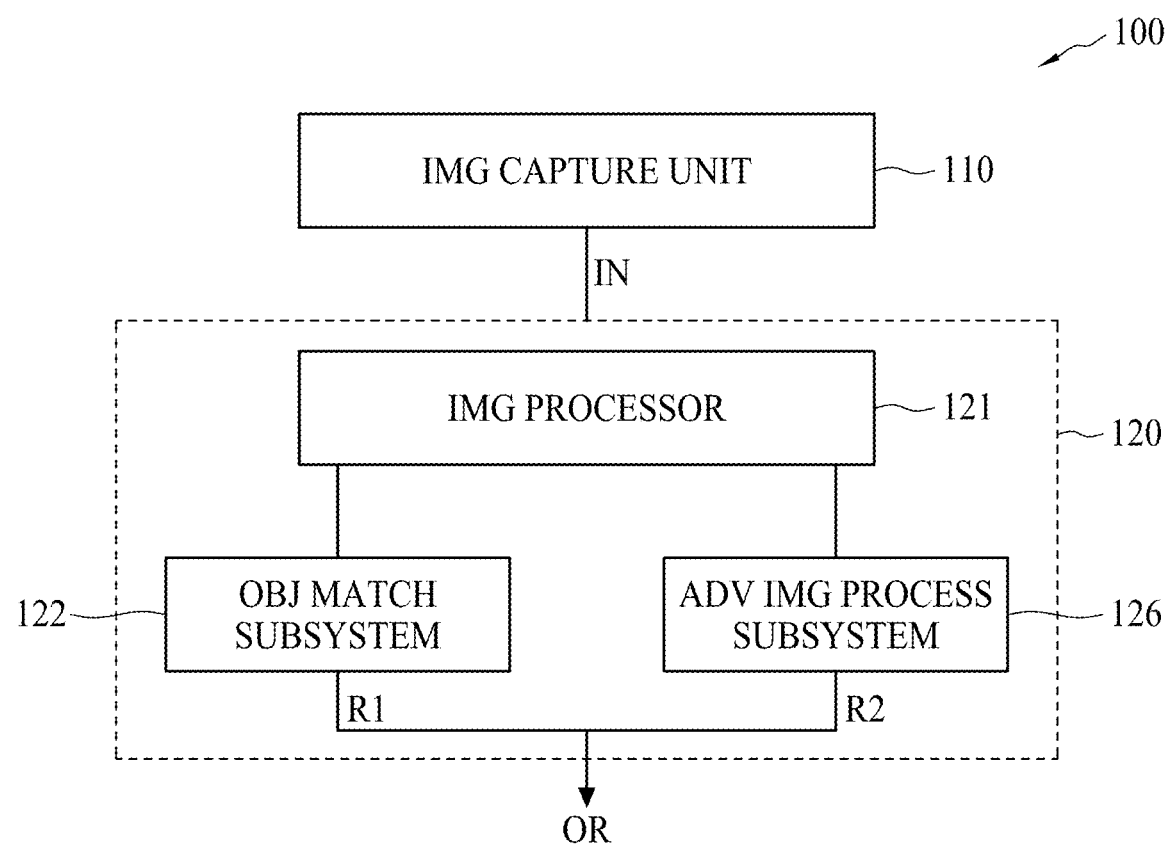
FIG. 3 is a block diagram of an image processing system for processing and reading the characters of a wafer mark according to some embodiments of the present disclosure.
Figure 4A:
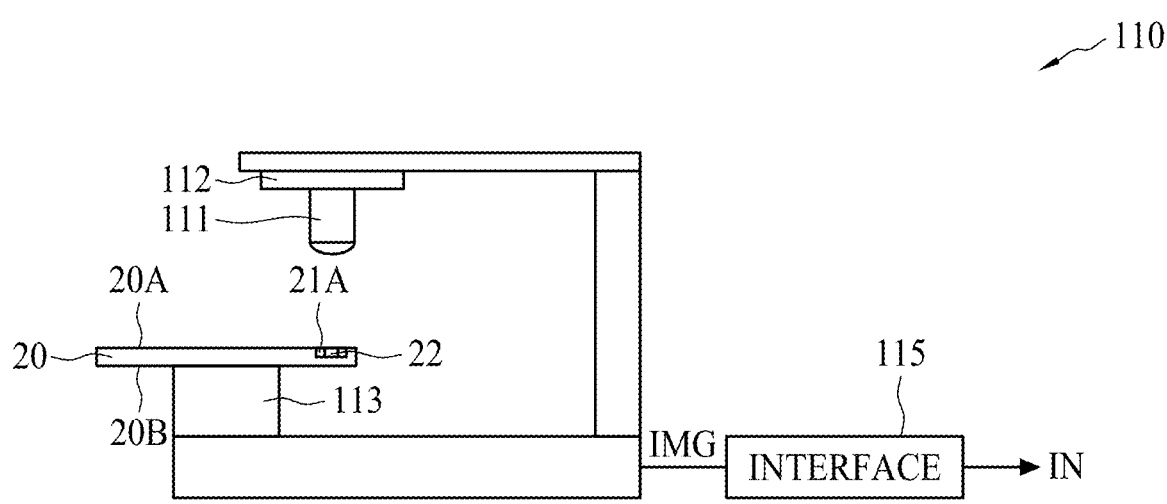
FIG. 4A and FIG. 4B are schematic diagrams of an image capturing unit of the image processing system in FIG. 3 according to some embodiments of the present disclosure.
Figure 4B:
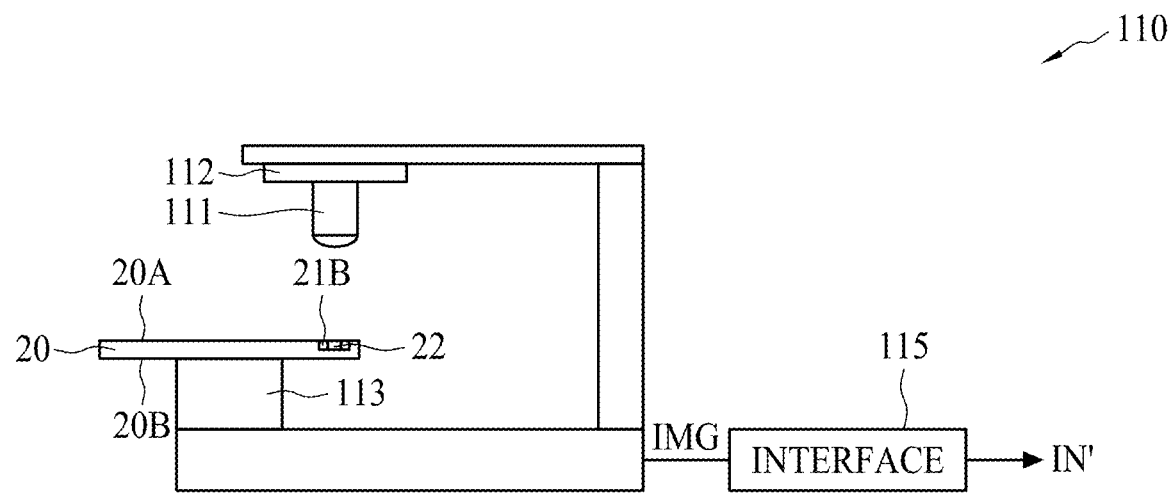
Figure 5:
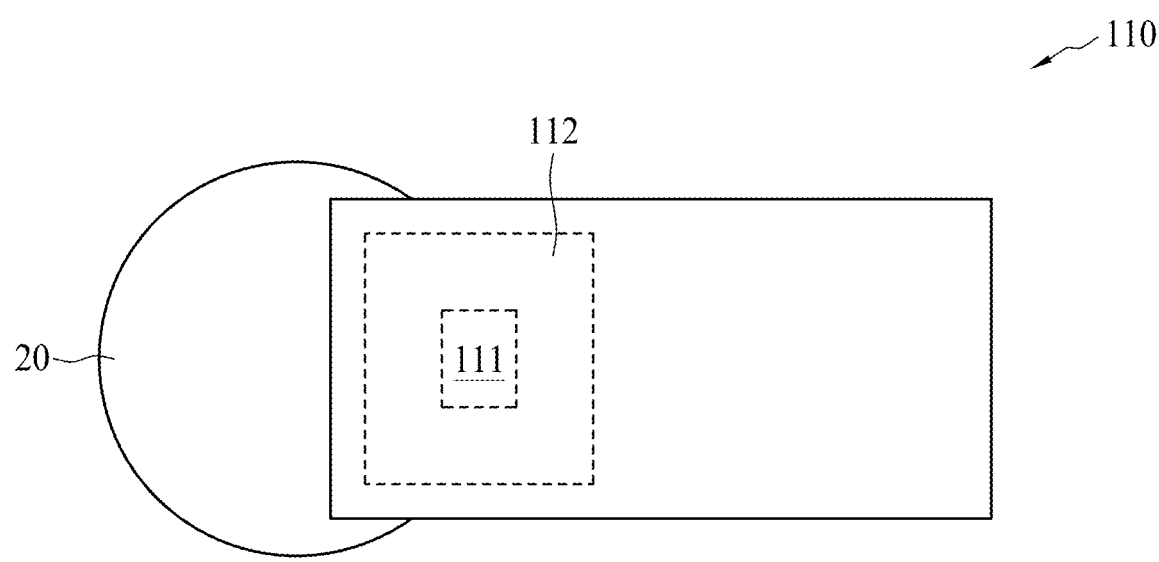
FIG. 5 is a schematic top view of the image capturing unit of the image processing system in FIG. 3 according to some embodiments of the present disclosure.

FIG. 3 is a block diagram of an image processing system 100 for processing and reading the characters of the wafer mark 22 according to some embodiments of the present disclosure. FIG. 4A and FIG. 4B are schematic diagrams of an image capturing unit 110 of the image processing system 100 according to some embodiments of the present disclosure. FIG. 5 is a schematic top view of the image capturing unit 110 of the image processing system 100 according to some embodiments of the present disclosure. With reference to FIG. 3, the image processing system 100 includes an image capturing unit 110 and an image processing unit 120. As shown in FIG. 4A and FIG. 4B, the image capturing unit 110 includes a camera 111, a light source 112, and a wafer transfer stage 113. In some embodiments, when the wafer mark 22 is printed in a frontside 20A of the wafer 20, the camera 111 may capture an image IMG of a region 21A of the wafer 20 having the wafer mark 22, as seen in FIG. 4A. An interface 115 receives the image IMG and generates an input signal IN for the image processing unit 120. In some embodiments, when the wafer mark 22 is printed in a backside 20B of the wafer 20, the camera 111 may capture an image IMG' of a region 21B of the wafer 20 having the wafer mark 22, as seen in FIG. 4B. The interface 115 receives the image IMG' and generates an input signal IN' for the image processing unit 120. With reference to FIG. 3, the image processing unit 120 includes an image processor 121, an object matching subsystem 122, and an advanced image processing subsystem 126. The image processor 121 is configured to perform calculations of the image processing unit 120 to generate an output result OR.

Figure 6A:
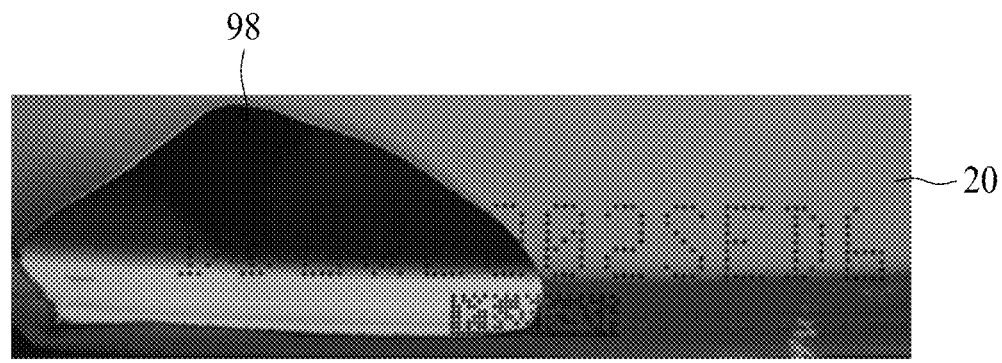
FIG. 6A and FIG. 6B are images of wafer marks being obscured by chemical residues and according to some embodiments of the present disclosure.
Figure 6B:
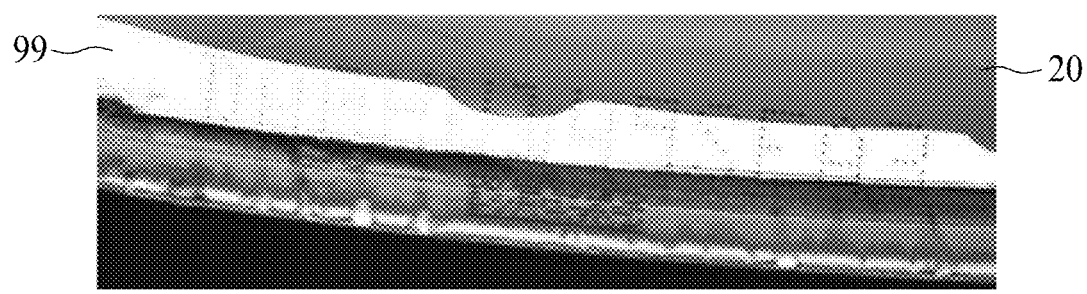

In some embodiments, with reference to FIG. 5, the light source 112 surrounds the camera 111, and the light source 112 is capable of projecting through a plurality of chemical residues on the wafer mark 22, for example. In some embodiments, the light source 112 is configured to provide a light of variable wavelength, intensity, and angle. FIG. 6A and FIG. 6B are images of wafer marks being obscured by chemical residues 98 and 99 according to some embodiments of the present disclosure. With reference to FIGS. 6A and 6B, the chemical residues 98 and 99 may be formed on the wafer 20 during the process sequence 7 for forming semiconductor devices shown in FIG. 1. Although the chemical residues 98 and 99 may obscure a portion of the sample mark (wafer mark 22), the light source 112 is capable of projecting through the chemical residues 98 and 99, and the image processing system 100 is able to process and identify the wafer mark 22. In some embodiments, the wafer transfer stage 113 is configured to carry the wafer 20, and the wafer transfer stage 113 may be attached to electrical and/or mechanical mechanisms (e.g. a robotic arm) capable of flipping the wafer 20 from one side to the other. In some embodiments, the camera 111 may be an area scan camera capable of capturing the image IMG' or the image IMG of the wafer mark 22 in the frontside 20A or the backside 20B the wafer 20. In some embodiments, the camera 111 may be a complementary metal-oxide semiconductor (CMOS) camera, a charge-coupled device (CCD) camera, a video camera, or another suitable type of camera. It should be noted that, although some figures of the present disclosure depict capturing the image IMG of the wafer mark 22 in the frontside 20A of the wafer 20 and the image IMG being used for an input signal IN of the image processing system 100, in alternative embodiments, the image IMG' of the wafer mark 22 in the backside 20B of the wafer may also be captured and used for the input signal IN' of the image processing system 100.

Figure 7:
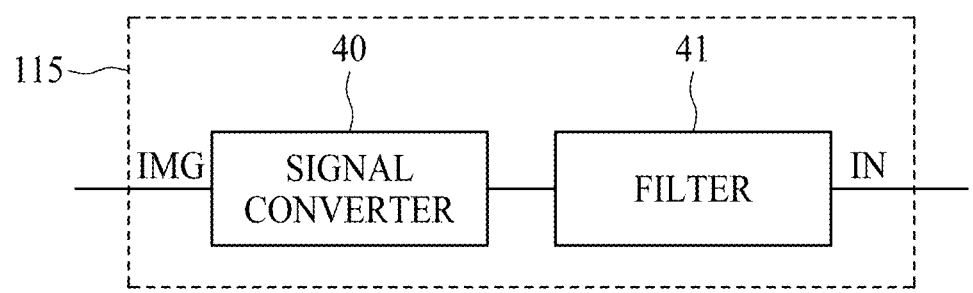
FIG. 7 is a block diagram of the interface of the image capturing unit in FIG. 3 according to some embodiments of the present disclosure.

FIG. 7 is a block diagram of the interface 115 of the image capturing unit 110 according to some embodiments of the present disclosure. With reference to FIG. 7, the interface 115 includes one or more signal converters 40 and one or more filters 41. In some embodiments, the signal converters 40 may include image file converters (e.g., image file compression converters), analog-to-digital (A/D) converters, digital-to-analog (D/A) converters, or other suitable signal converters. When generating the input signal IN for the image processing unit 120, the signal converters 40 of the interface 115 may convert the image IMG to another image format, convert the image IMG from a raw image file to a compressed image file, convert the image IMG from a compressed image file to a raw image file, or perform other suitable types of conversions. The filters 41 may include photography filers, anti-alias filters, low-pass filters, high-pass filters, band-pass filters, or other suitable filters for the particular application of the image processing system 100. The filters 41 may be used to improve the signal to noise ratio of the input signal IN, for instance.

Figures 8, 9A, 9B:
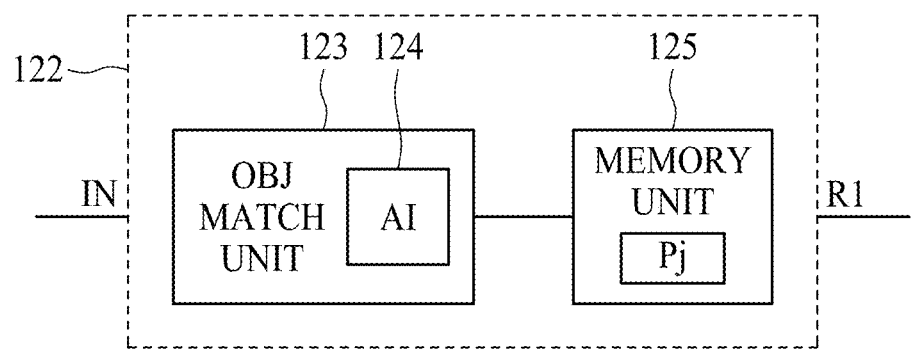
FIG. 8 is a block diagram of an object matching subsystem in FIG. 3 according to some embodiments of the present disclosure.
FIG. 9A and FIG. 9B are images of wafer marks according to some embodiments of the present disclosure.

FIG. 8 is a block diagram of the object matching subsystem 122 according to some embodiments of the present disclosure. With reference to FIG. 8, the object matching subsystem 122 includes an object matching unit 123 and a memory unit 125. The object matching unit 123 includes an artificial intelligence (AI) statistical model 124 for performing a statistical analysis to identify each character of the wafer mark 22. The memory unit 125 stores a set of probabilities Pj for detecting each character of the wafer mark 22 in each image IMG of the wafer mark 22. FIG. 9A and FIG. 9B are images of wafer marks according to some embodiments of the present disclosure. The example images of wafer marks shown in FIG. 9A and FIG. 9B were imaged using different configurations of the light source 112 and the characters were identified by optical image recognition or other suitable recognition techniques. In some embodiments, the statistical analysis performed by the object matching unit 123 includes comparing the set of probabilities for detecting each character of the wafer mark to a threshold value T. In some embodiments, the statistical analysis performed by the object matching unit 123 further includes identifying each character of the wafer mark 22 by finding each character having a highest probability in the comparison between the set of probabilities Pj stored in the memory unit 125 and the threshold value T, among all of the images of the wafer mark 22. In some embodiments, the statistical analysis performed by the object matching unit 123 using the AI statistical model 124 can be summarized by equations 1 and 2:

$$\text{character} = \text{Max}\left\{\sum_{all\,img} (\text{Thresh}(T,\ Pj) * Pj)\right\} \quad (1)$$

$$\text{Thresh}(T, Pj) = \begin{cases} 0 \text{ if } Pj - T < 0 \\ 1 \text{ if } Pj - T > 0 \end{cases} \quad (2)$$

where T is the threshold value and j represents each possible character in the wafer mark 22. According to equations 1 and 2, the object matching unit 123 finds each character having a highest probability in the comparison between the set of probabilities Pj stored in the memory unit 125 and the threshold value T, in which the set of probabilities Pj is determined by the AI statistical model 124 of the object matching unit 123. In some embodiments, the AI statistical model 124 may be a deep learning statistical model, for example, although other machine learning models, algorithms and/or techniques may be used. In some embodiments, an intermediate result R1 is outputted by the object matching subsystem 122, as shown in FIG. 8.

Figure 10:
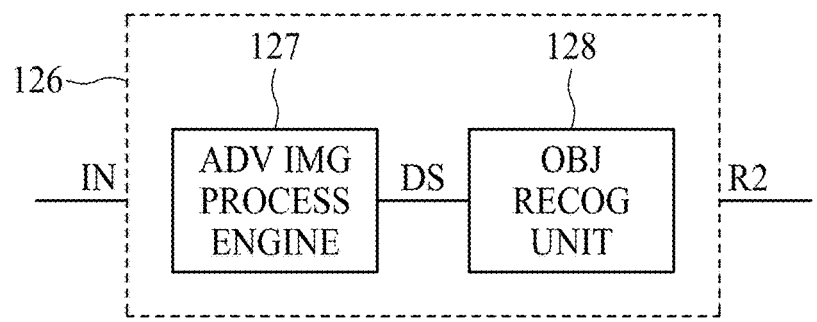
FIG. 10 is a block diagram of an advanced image processing subsystem in FIG. 3 according to some embodiments of the present disclosure.
Figure 11A:
FIG. 11A, FIG. 11B, and FIG. 11C are schematic views of an edge detection and image stacking technique used by the advanced image processing subsystem according to some embodiments of the present disclosure.
Figure 11B:
Figure 11C:

FIG. 10 is a block diagram of the advanced image processing subsystem 126 according to some embodiments of the present disclosure. FIG. 11A, FIG. 11B, and FIG. 11C are schematic views of an edge detection and image stacking technique used by the advanced image processing subsystem 126 according to some embodiments of the present disclosure. With reference to FIG. 9, the advanced image processing subsystem 126 includes an advanced image processing engine 127 and an object recognition unit 128. The advanced image processing engine 127 and the object recognition unit 128 utilize an edge detection and image stacking technique to further process the image IMG of the wafer mark 22. As shown in FIG. 11A and FIG. 11B, the images in FIG. 11A are captured with different configurations of the light source 112, and the images in FIG. 11A and FIG. 11B have been processed by the advanced image processing engine 127 and the object recognition unit 128 using the edge detection and image stacking technique and displayed in FIG. 11 C. Accordingly, in some embodiments, the edge detection and image stacking technique performed in the advanced image processing subsystem 126 enhances the probability of successful detection of the characters in the wafer mark 22. In some embodiments, an intermediate result R2 is outputted by the advanced image processing subsystem 126, as shown in FIG. 10. In some embodiments, image processor 121 is configured to perform calculations of the image processing unit 120 and generate an output result OR according to the intermediate results R1 and R2, and the characters of the wafer mark 22 are identified in the output result OR. It should be noted and appreciated that, the object matching performed by the object matching subsystem 122, and the detection and stacking technique performed by the advanced image process subsystem 126 may be done concurrently or in any order. In some embodiments, the wafer mark 22 processed by the image processing system 100 may conform to a Semiconductor Equipment and Materials International (SEMI) character standard.

Figure 12:
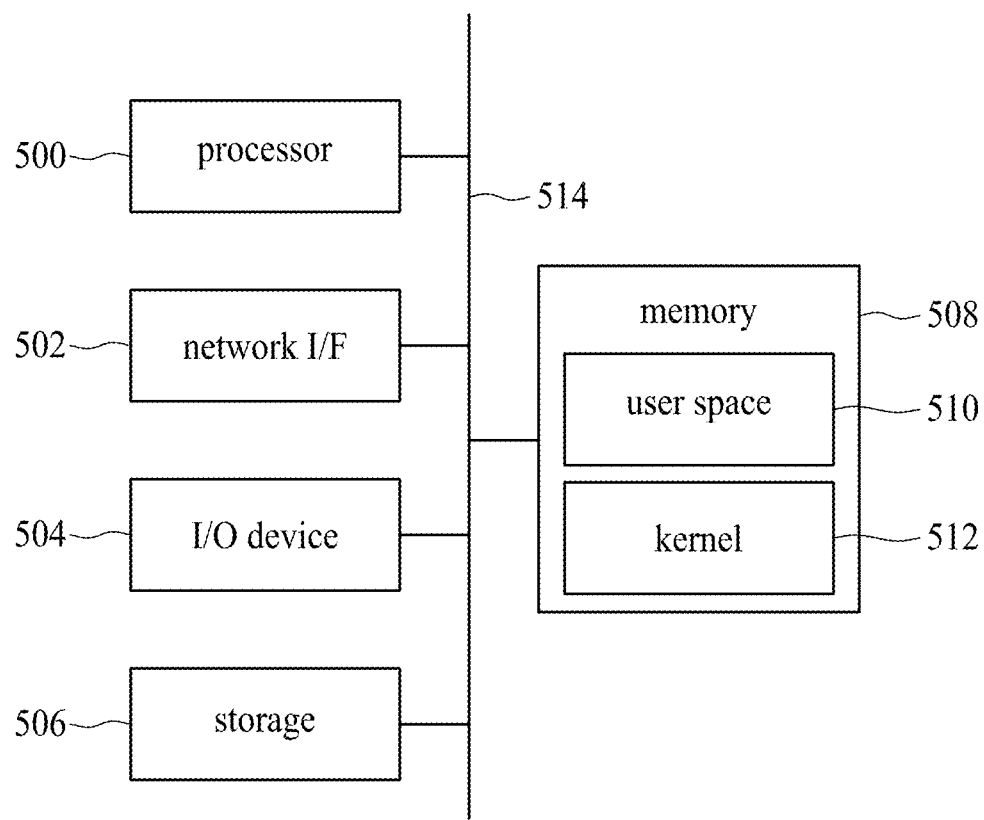
FIG. 12 is a block diagram of a computer system according to some embodiments of the present disclosure.

It should be noted that one or more of the tools, subsystems, methods, or operations described in the present disclosure may be realized by a computer system including instructions operable when executed by one or more processors of the computer system. For example, the image processing system 100 and a method 600 described later in the present disclosure may be implemented by a computer system depicted in FIG. 12. FIG. 12 is a block diagram of a computer system 80 according to some embodiments of the present disclosure. With reference to FIG. 12, the computer system 80 may include one or more processors 500, a network interface (I/F) 502, a storage device 506, a memory 508, and an input/output (I/O) device 504 communicatively coupled via a bus 514 or other interconnection communication mechanism. The memory 508 includes, in some embodiments, a random access memory (RAM), other dynamic storage device, read-only memory (ROM), or other static storage device, coupled to the bus 514 for storing data or instructions to be executed by the one or more processors 500, and the memory 508 may include a kernel 512, a user space 510, portions of the kernel or the user space, and components thereof. The memory 508 is also used, in some embodiments, for storing temporary variables or other intermediate information during execution of instructions to be executed by the one or more processors 500.

In some embodiments, the storage device 506 is coupled to the bus 514 for transferring data or instructions to, for example, the kernel 512, user space 510, etc. In some embodiments, the operations and functionalities are realized as functions of a program stored in the storage device 506, which may include one or more computer-readable non-transitory storage media coupled to the one or more processors 500. Examples of the computer-readable non-transitory storage media include, but are not limited to, external/removable or internal/built-in storage or memory unit, e.g., one or more of an optical disk, such as a DVD, a magnetic disk, such as a hard disk, a semiconductor memory, such as a ROM, a RAM, a memory card, and the like. In some embodiments, the computer-readable non-transitory storage media of the storage device 506 includes instructions operable when executed by the one or more processors 500 to cause the image processing system 100 to: receive the image IMG captured by the camera 111; perform a statistical analysis using an artificial intelligence (AI) statistical model 124 to identify each character of the wafer mark 22; store the set of probabilities Pj for detecting each character of the wafer mark in each image IMG of the wafer mark 22; and perform calculations to generate the output result OR. In some embodiments, the one or more computer-readable non-transitory storage media further includes instructions operable when executed by the one or more processors 500 to cause the image processing system 100 to utilize an edge detection and image stacking technique to further process the image IMG of the wafer mark 22. In some embodiments, the statistical analysis includes comparing the set of probabilities Pj for detecting each character of the wafer mark 22 to the threshold value T. In some embodiments, the statistical analysis further includes identifying each character of the wafer mark 22 by finding each character having a highest probability in the comparison between the stored set of probabilities Pj and the threshold value T, among all of the images IMG of the wafer mark 22.

In some embodiments, the I/O device 604 includes an input device, an output device, or a combined input/output device for enabling user interaction with the analysis unit 105. An input device includes, for example, a keyboard, keypad, mouse, trackball, trackpad, or cursor direction keys for communicating information and commands to the processor 500. An output device includes, for example, a display, a printer, a voice synthesizer, etc. for communicating information to a user. In some embodiments, one or more operations or functionalities of the tools, subsystems, and methods described in the present disclosure are realized by the one or more processors 500 of the computer system 80, which is programmed for performing such operations and functionalities. One or more of the memory 508, the network I/F 502, the storage device 506, the I/O device 504, and the bus 514 are operable to receive instructions, data, design rules, netlists, layouts, models and other parameters for processing by the processor 500. In some embodiments, one or more of the operations and functionalities of the tools, subsystems, and methods described in the present disclosure may be implemented by specifically configured hardware (e.g., by one or more application specific integrated circuits (ASICs)) separate from or in lieu of the processor 500. Some embodiments incorporate more than one of the described operations or functionality in a single ASIC.

Figure 13:
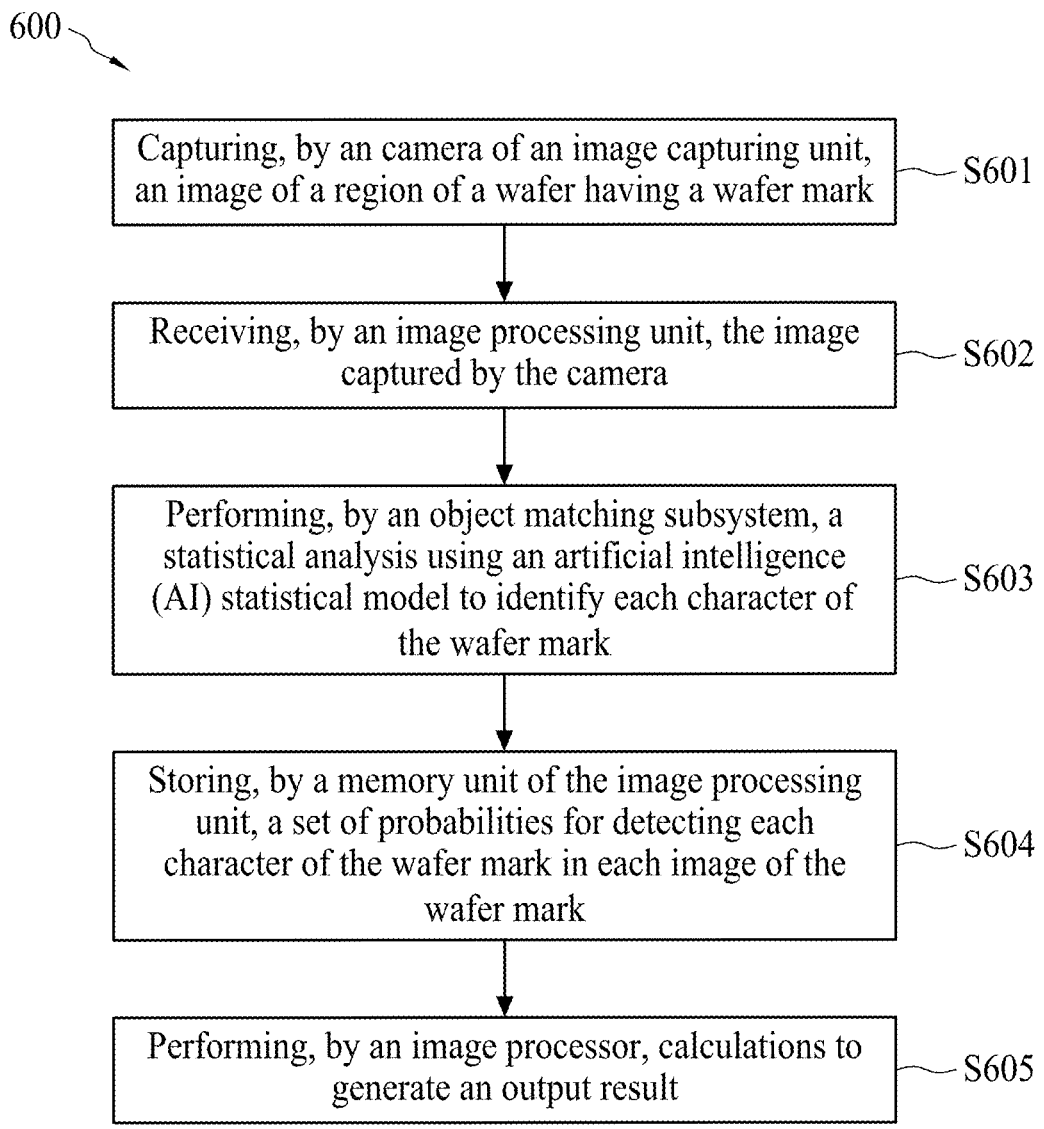
FIG. 13 is a flow diagram of an image processing method for processing and reading the wafer mark according to some embodiments of the present disclosure.

FIG. 13 is a flow diagram of an image processing method 600 for processing and reading the wafer mark 22 according to some embodiments of the present disclosure. In some embodiments, the method 600 may be implemented by the image processing system 100 depicted in FIG. 3, and the method 600 may also be realized by the computer system 80 depicted in FIG. 12. With reference to FIG. 13, the image processing method 600 for processing and reading the wafer mark 22 includes: capturing, by the camera 111 of the image capturing unit 110, an image IMG of the region 21A of the wafer 20 having the wafer mark 22 (Step S601); receiving, by an image processing unit 120, the image IMG captured by the camera 111 (Step S602); performing, by the object matching subsystem 122, a statistical analysis using the artificial intelligence (AI) statistical model 124 to identify each character of the wafer mark 22 (Step S603); storing, by the memory unit 125 of the image processing unit 120, the set of probabilities Pj for detecting each character of the wafer mark 22 in each image IMG of the wafer mark 22 (Step S604); and performing, by the image processor 121, calculations to generate the output result R1.

Figure 14:
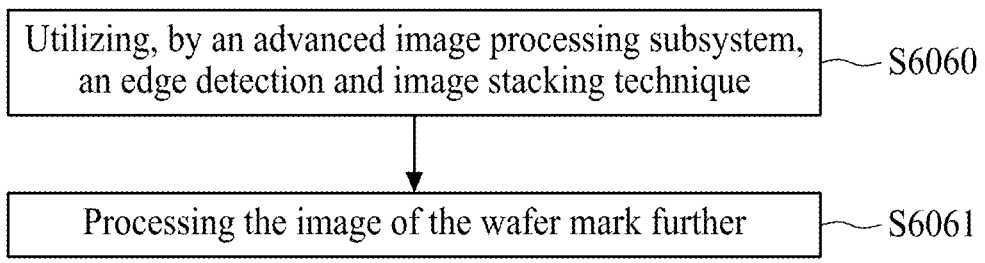
FIG. 14 is a flow diagram showing the detailed operation of the image processing method according to some embodiments of the disclosure.
Figure 15:
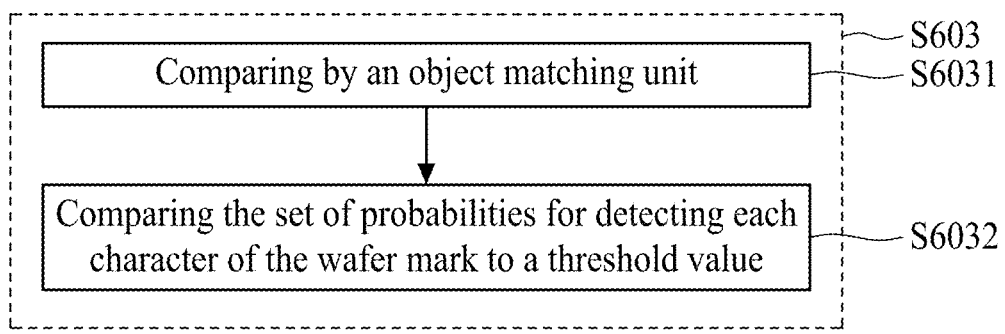
FIG. 15 is a flow diagram showing the detailed operation of the Step S604 in the image processing method according to some embodiments of the disclosure.
Figure 16:
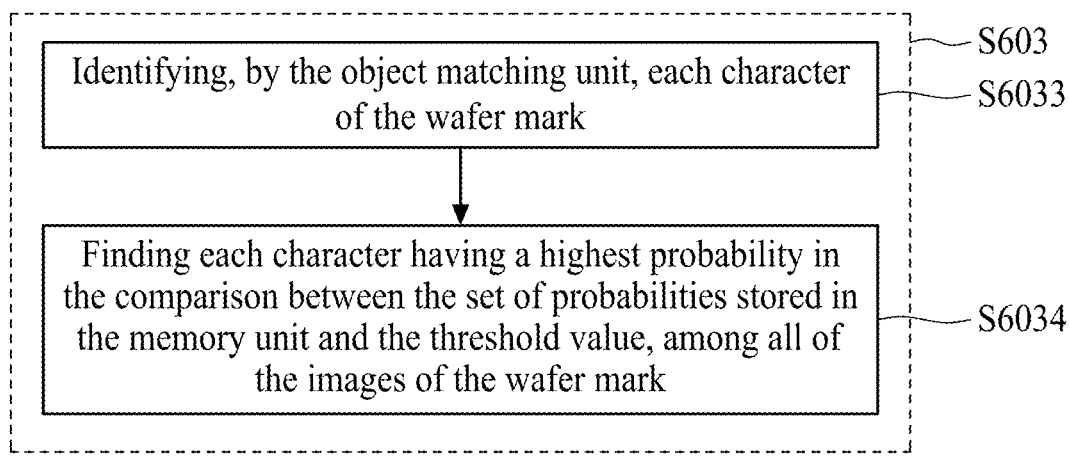
FIG. 16 is a flow diagram showing the detailed operation of the Step S604 in the image processing method in the method according to some embodiments of the disclosure.

FIG. 14 is a flow diagram of the method 600 according to some embodiments of the disclosure. In some embodiments, the method 600 further includes utilizing, by the advanced image processing subsystem 126, an edge detection and image stacking technique (Step S6060) to further process the image IMG of the wafer mark 22 (Step S6061). FIG. 15 is a flow diagram of the Step S603 in the method 600 according to some embodiments of the disclosure. In some embodiments, Step S603 in the method 600 further includes comparing, by the object matching unit 122 (Step S6031), the set of probabilities Pj for detecting each character of the wafer mark 22 to the threshold value T (Step S6032). FIG. 16 is a flow diagram of the Step S603 in the method 600 according to some embodiments of the disclosure. In some embodiments, Step S603 in the method 600 further includes identifying, by the object matching unit 122, each character of the wafer mark 22 (Step S6033) by finding each character having the highest probability in the comparison between the set of probabilities Pj stored in the memory unit 125 and the threshold value T, among all of the images IMG of the wafer mark 22 (Step S6034).

In some embodiments, the camera 111 is an area scan camera capable of capturing the image IMG of the wafer mark 22 in the backside 20B or the frontside 20A of the wafer 20, and the light source 112 of the image capturing unit 110 is configured to provide a light of variable wavelength, intensity, and angle. In some embodiments, the wafer mark 22 conforms to a Semiconductor Equipment and Materials International (SEMI) character standard.

Accordingly, the image processing system 100 and the image processing method 600 for processing and reading the wafer mark 22 are capable of performing successful wafer identifications despite the wafer mark 22 being covered by chemical residues. By combining AI statistical modeling and advanced image processing techniques, the system 100 and method 600 can process and read complete wafer marks, whereas traditional machine vision systems are limited by preset conditions. Therefore, timely and accurate identification of wafers can be achieved by the system 100 and method 600 of the present disclosure.

One aspect of the present disclosure provides an image processing system, including an image capturing unit and an image processing unit. The image capturing unit includes a camera, a light source, and a wafer transfer stage. The camera captures an image of a region of a wafer having a wafer mark. The light source surrounds the camera and is capable of projecting through a plurality of chemical residues on the wafer mark. The wafer transfer stage is configured to carry the wafer. The image processing unit includes an image processor and an object matching subsystem. The image processor is configured to perform calculations of the image processing unit to generate an output result. The object matching subsystem includes an object matching unit and a memory unit. The object matching unit includes an artificial intelligence (AI) statistical model for performing a statistical analysis to identify each character of the wafer mark. The memory unit stores a set of probabilities of the object matching unit detecting each character of the wafer mark in each image of the wafer mark.

Another aspect of the present disclosure provides an image processing system, including an image capturing unit, one or more processors, and one or more computer-readable non-transitory storage media. The image capturing unit includes a camera, a light source, and a wafer transfer stage. The camera captures an image of a region of a wafer having a wafer mark. The light source surrounds the camera and is capable of projecting through a plurality of chemical residues on the wafer mark. The wafer transfer stage is configured to carry the wafer. The one or more computer-readable non-transitory storage media is coupled to the one or more processors and includes instructions operable when executed by the one or more processors to cause the image processing system to: receive the image captured by the camera; perform a statistical analysis using an artificial intelligence (A) statistical model to identify each character of the wafer mark; store a set of probabilities for detecting each character of the wafer mark in each image of the wafer mark; and perform calculations to generate an output result.

Another aspect of the present disclosure provides an image processing method including: capturing, by an camera of an image capturing unit, an image of a region of a wafer having a wafer mark; receiving, by an image processing unit, the image captured by the camera; performing, by an object matching subsystem, a statistical analysis using an artificial intelligence (AT) statistical model to identify each character of the wafer mark; storing, by a memory unit of the image processing unit, a set of probabilities for detecting each character of the wafer mark in each image of the wafer mark; and performing, by an image processor, calculations to generate an output result.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, and steps.

What is claimed is:

1. An image processing system comprising:
  an image capturing unit comprising:
    a camera capturing an image of a region of a wafer having a wafer mark;
    a light source surrounding the camera, the light source capable of projecting through a plurality of chemical residues on the wafer mark, with different configurations; and
    a wafer transfer stage for carrying the wafer;
  an image processing unit comprising:
    an image processor configured to perform calculations of the image processing unit to generate an output result; and
    an object matching subsystem comprising:
      an object matching unit comprising an artificial intelligence (AI) statistical model for performing a statistical analysis to identify each character of the wafer mark; and
      a memory unit storing a set of probabilities of the object matching unit detecting each character of the wafer mark in each image of the wafer mark;
      wherein the statistical analysis comprises comparing the set of probabilities, stored in the memory unit and determined by the AI statistical model, for detecting each character of the wafer mark to a threshold value.

2. The image processing system of claim 1, wherein the image processing unit further comprises:
  an advanced image processing subsystem comprising an advanced image processing engine and an object recognition unit, wherein the advanced image processing engine and the object recognition unit utilize an edge detection and image stacking technique to further process the image of the wafer mark.

3. The image processing system of claim 1, wherein the statistical analysis performed by the object matching unit further comprises identifying each character of the wafer mark by finding each character having a highest probability in the comparison between the set of probabilities stored in the memory unit and the threshold value, among all of the images of the wafer mark.

4. The image processing system of claim 1, wherein the camera is an area scan camera capable of capturing the image of the wafer mark in a backside or a frontside of the wafer.

5. The image processing system of claim 1, wherein the light source is configured to provide a light of variable wavelength, intensity, and angle.

6. The image processing system of claim 1, wherein the wafer mark conforms to a Semiconductor Equipment and Materials International (SEMI) character standard.

7. An image processing system comprising:
  an image capturing unit comprising:
    a camera capturing an image of a region of a wafer having a wafer mark;
    a light source surrounding the camera, the light source capable of projecting through a plurality of chemical residues on the wafer mark, with different configurations; and
    a wafer transfer stage for carrying the wafer;
  one or more processors; and
  one or more computer-readable non-transitory storage media coupled to the one or more processors and comprising instructions operable when executed by the one or more processors to cause the image processing system to:

receive the image captured by the camera;

perform a statistical analysis using an artificial intelligence (AI) statistical model to identify each character of the wafer mark;

store a set of probabilities for detecting each character of the wafer mark in each image of the wafer mark;

compare the set of probabilities, stored in the memory unit and determined by the AI statistical model, for detecting each character of the wafer mark to a threshold value; and perform calculations to generate an output result.

8. The image processing system of claim 7, the one or more computer-readable non-transitory storage media further comprising instructions operable when executed by the one or more processors to cause the image processing system to utilize an edge detection and image stacking technique to further process the image of the wafer mark.

9. The image processing system of claim 7, wherein the statistical analysis further comprises identifying each character of the wafer mark by finding each character having a highest probability in the comparison between the stored set of probabilities and the threshold value, among all of the images of the wafer mark.

10. The image processing system of claim 7, wherein the camera is an area scan camera capable of capturing the image of the wafer mark in a backside or a frontside of the wafer.

11. The image processing system of claim 7, wherein the light source is configured to provide a light of variable wavelength, intensity, and angle.

12. The image processing system of claim 7, wherein the wafer mark conforms to a Semiconductor Equipment and Materials International (SEMI) character standard.

13. An image processing method comprising:

capturing, by a camera of an image capturing unit, an image of a region of a wafer having a wafer mark;

receiving, by the image processing unit, the image captured by the camera;

performing, by an object matching subsystem, a statistical analysis using an artificial intelligence (AI) statistical model to identify each character of the wafer mark;

storing, by a memory unit of the image processing unit, a set of probabilities for detecting each character of the wafer mark in each image of the wafer mark;

comparing, by an object matching unit, the set of probabilities, stored in the memory unit and determined by the AI statistical model, for detecting each character of the wafer mark to a threshold value; and performing, by an image processor, calculations to generate an output result.

14. The image processing method of claim 13, further comprising utilizing, by an advanced image processing subsystem, an edge detection and image stacking technique to further process the image of the wafer mark.

15. The image processing method of claim 13, wherein the step of performing the statistical analysis further comprises identifying, by the object matching unit, each character of the wafer mark by finding each character having a highest probability in the comparison between the set of probabilities stored in the memory unit and the threshold value, among all of the images of the wafer mark.

16. The image processing method of claim 13, wherein the camera is an area scan camera capable of capturing the image of the wafer mark in a backside or a frontside of the wafer, and a light source of the image capturing unit is configured to provide a light of variable wavelength, intensity, and angle, with different configurations.

17. The image processing method of claim 13, wherein the wafer mark conforms to a Semiconductor Equipment and Materials International (SEMI) character standard.

* * * * *